(12) United States Patent
Miyamoto et al.

(10) Patent No.: US 10,967,324 B2
(45) Date of Patent: Apr. 6, 2021

(54) RECLAIMING APPARATUS AND METHOD, AND $CO_2$ RECOVERY DEVICE AND METHOD

(71) Applicant: Mitsubishi Heavy Industries Engineering, Ltd., Kanagawa (JP)

(72) Inventors: Osamu Miyamoto, Houston, TX (US); Takashi Kamijo, Kanagawa (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 142 days.

(21) Appl. No.: 16/156,129

(22) Filed: Oct. 10, 2018

(65) Prior Publication Data

US 2020/0114303 A1  Apr. 16, 2020

(51) Int. Cl.
*B01D 53/14* (2006.01)
*B01D 53/78* (2006.01)
*B01D 53/18* (2006.01)
*C01B 32/50* (2017.01)
*B08B 17/02* (2006.01)
*B08B 9/032* (2006.01)
*B01D 5/00* (2006.01)
(Continued)

(52) U.S. Cl.
CPC ....... *B01D 53/1425* (2013.01); *B01D 5/0069* (2013.01); *B01D 53/1418* (2013.01); *B01D 53/1475* (2013.01); *B01D 53/18* (2013.01); *B01D 53/62* (2013.01); *B01D 53/78* (2013.01); *B08B 9/0321* (2013.01); *B08B 17/02* (2013.01); *C01B 32/50* (2017.08); *B01D 53/92* (2013.01); *B01D 2257/504* (2013.01); *B08B 2209/032* (2013.01)

(58) Field of Classification Search
CPC .. B01D 3/1418; B01D 3/1425; B01D 3/1475; B01D 3/18; B01D 5/0069; B01D 53/92; B08B 9/0321; B08B 17/02; B08B 2209/032; B08B 17/00; C01B 32/50; F28G 9/00; F28G 9/005
See application file for complete search history.

(56) References Cited

U.S. PATENT DOCUMENTS 5,993,608 A  11/1999  Abry et al.
7,421,757 B1 *  9/2008  Garcia, Jr. ............. B05B 1/083
15/304
(Continued)

FOREIGN PATENT DOCUMENTS

JP  2008221166 A  *  9/2008  ......... B01D 53/1425
JP  4875522 B2  2/2012

OTHER PUBLICATIONS

JP2008221166A_ENG (Espacenet machine translation of Iijima) (Year: 2008).*

*Primary Examiner* — Jonathan Miller
*Assistant Examiner* — Gabriel E Gitman
(74) *Attorney, Agent, or Firm* — Osha Bergman Watanabe & Burton LLP (57) ABSTRACT

A reclaiming apparatus includes: a container in which reclaiming process of an absorption liquid is performed; a waste liquid line configured through which a waste liquid from the container flows; a waste liquid cooler, installed in the waste liquid line, for cooling the waste liquid from the container; and a cleaning-water supply line for supplying the waste liquid cooler with cleaning water for cleaning the waste liquid cooler.

13 Claims, 5 Drawing Sheets

(51) Int. Cl.
*B01D 53/62* (2006.01)
*B01D 53/92* (2006.01)

(56) References Cited

U.S. PATENT DOCUMENTS

| | | | |
|---|---|---|---|
| 9,782,720 B2* | 10/2017 | Yukumoto | G01N 27/02 |
| 2010/0144908 A1* | 6/2010 | Campbell | B01D 53/1481 |
| | | | 521/26 |
| 2011/0092355 A1* | 4/2011 | Iijima | B01D 53/1425 |
| | | | 502/55 |
| 2013/0192465 A1* | 8/2013 | Trofimuk | B01D 19/0036 |
| | | | 95/179 |

* cited by examiner

RECLAIMING APPARATUS AND METHOD, AND CO$_2$ RECOVERY DEVICE AND METHOD

TECHNICAL FIELD

The present disclosure relates to a reclaiming apparatus, a reclaiming method, a CO$_2$ recovery apparatus, and a CO$_2$ recovery method.

BACKGROUND ART

As a method of recovering CO$_2$ contained in exhaust gas from a power generation facility or the like, a chemical absorption method is often used.

In a chemical absorption method, exhaust gas containing CO$_2$ and an absorption liquid containing an absorption agent make contact, and the absorption liquid absorbs CO$_2$ in the exhaust gas. Accordingly, CO$_2$ is removed from exhaust gas. The absorption liquid having absorbed CO$_2$ releases the absorbed CO$_2$ to be regenerated, by being heated by steam or the like, and is re-utilized as an absorption liquid. As the absorption liquid is re-utilized repeatedly, impurity substances from exhaust gas and depleted materials from the absorption liquid accumulate in the absorption liquid. Reclaiming is performed to remove such depleted materials or the like accumulating in the absorption liquid from the absorption liquid.

According to Patent Document 1, the above described reclaiming includes supplying a reclaimer (container) with water and an absorption liquid which has absorbed CO$_2$ in the exhaust gas, and heating the liquid (absorption liquid and water) inside the container, thereby recovering the evaporated absorption liquid, returning the absorption liquid to the regeneration tower, and separating condensed depleted materials in the absorption liquid from the absorption liquid.

Further, in Patent Document 1, when a high-temperature condensed waste containing depleted materials separated from the absorption liquid in the reclaimer is discharged outside of the system, the condensed waste is cooled proactively through a cooler, in order to cool the condensed waste to be discharged in a short period of time.

CITATION LIST

Patent Literature

Patent Document 1: JP4875522B

SUMMARY

As disclosed in Patent Document 1, by cooling the reclaimer waste liquid (condensed waste) through a cooler, it is possible to shorten the cooling time compared to natural cooling, and discharge the waste liquid quickly from the reclaimer.

Furthermore, in a case where the waste liquid cooler (cooler) is used to cool the reclaimer waste liquid, it is necessary to clean the waste liquid cooler after usage, in order to remove dirty substances adhering to the heat-transfer tubes of the like of the waste liquid cooler. Typically, by machine-cleaning the waste liquid regularly after a period of operation, dirty substances are removed from the waste liquid cooler.

However, in a case where machine cleaning is performed as described above, it takes time to clean the waste liquid cooler after discharge of the reclaimer waste liquid out of the system through the waste liquid cooler. Thus, dirty substances from the waste liquid tend to adhere to the heat-transfer tubes of the waste liquid cooler, and thereby the cooling performance of the waste liquid cooler decreases.

In view of the above, an embodiment of at least one embodiment of the present invention is to provide a reclaiming apparatus and a reclaiming method, and a CO$_2$ recovery apparatus and a CO$_2$ recovery method capable of cleaning the waste liquid cooler efficiently.

(1) According to at least one embodiment of the present invention, a reclaiming apparatus includes: a container in which a reclaiming process of an absorption liquid is performed; a waste liquid line through which the waste liquid from the container flows; a waste liquid cooler, installed in the waste liquid line, for cooling a waste liquid from the container; and a cleaning-water supply line for supplying the waste liquid cooler with a cleaning water for cleaning the waste liquid cooler.

According to the above configuration (1), it is possible to supply the waste liquid cooler with cleaning water via the cleaning-water supply line, and thereby it is possible to clean the waste liquid cooler immediately after discharging the waste liquid from the container. Thus, it is possible to clean the waste liquid cooler efficiently, and thereby it is possible to prevent the waste liquid cooler from getting dirty effectively.

(2) In some embodiments, in the above configuration (1), the cleaning-water supply line is connected to the waste liquid line, and the reclaiming device is configured such that the cleaning water is supplied to the waste liquid cooler via the waste liquid line.

According to the above configuration (2), it is possible to supply the waste liquid cooler with the cleaning liquid via the cleaning liquid supply line connected to the waste liquid line, and thereby it is possible to simplify the structure of the supply system of the cleaning liquid. Further, with the above configuration (2), it is possible to clean a part of the waste liquid line.

(3) In some embodiments, in the above configuration (1) or (2), the reclaiming apparatus further includes a line configured to be capable of supplying the container with the cleaning water after cleaning the waste liquid cooler.

With the above configuration (3), as the cleaning water after cleaning the waste liquid cooler can be supplied to the container, it is possible to utilize cleaning water supplied to the waste liquid cooler in the reclaiming process. As described above, by making effective use of cleaning water after cleaning the waste liquid cooler, it is possible to reduce the usage amount of water in the entire reclaiming apparatus, and perform the reclaiming process more efficiently.

(4) In some embodiments, in the above configuration (3), the cleaning-water supply line is connected to the waste liquid line at the upstream of the waste liquid cooler, and the reclaiming apparatus further includes a recycle line for supplying the container with the cleaning water in the waste liquid line at the downstream of the waste liquid cooler.

With the above configuration (4), it is possible to supply the container with cleaning water after cleaning the waste liquid cooler through a simple configuration in which a recycle line is installed between the container and the waste liquid line at the downstream of the waste liquid cooler.

(5) In some embodiments, in the above configuration (3), the cleaning-water supply line is connected to the waste liquid line at the downstream of the waste liquid cooler, and the reclaiming apparatus is configured such that the container is supplied with the cleaning water after cleaning the waste liquid cooler from the waste liquid cooler via the waste liquid line at the upstream of the waste liquid cooler.

With the above configuration (5), it is possible to supply the container with cleaning water after cleaning the waste liquid cooler through a simple configuration utilizing the waste liquid line at the upstream of the waste liquid cooler.

(6) In some embodiments, in any one of the above configurations (1) to (5), the reclaiming apparatus further includes a waste liquid pump, installed in the waste liquid line, for pumping the waste liquid from the container.

With the above configuration (6), a waste liquid pump for pumping the waste liquid is provided, and thereby it is possible to shorten the time required to discharge the waste liquid from the container.

(7) In some embodiments, in any one of the above configurations (1) to (6), the reclaiming apparatus further includes: a temperature sensor configured to measure a temperature of the waste liquid line at the downstream of the waste liquid cooler; and a control device configured to adjust a discharge amount of the waste liquid via the waste liquid line based on a measurement result of the temperature sensor.

With the above configuration (7), the discharge amount of the waste liquid via the waste liquid line is adjusted on the basis of the measurement result of the temperature of the waste liquid line at the downstream of the waste liquid cooler, and thus it is possible to maintain the waste liquid temperature at the time of discharge appropriately. Accordingly, for instance, it is possible to suppress adherence of dirty substances to the waste liquid cooler due to excessive cooling of the waste liquid.

(8) According to at least one embodiment of the present invention, a $CO_2$ recovery apparatus includes: an absorption tower configured to remove $CO_2$ in exhaust gas by contacting with an absorption liquid containing an absorption agent; a regeneration tower for regenerating the absorption liquid from the absorption tower; and the reclaiming apparatus according to any one of the above (1) to (7). The $CO_2$ recovery apparatus is configured such that at least a part of the absorption liquid stored in the regeneration tower is supplied to the container.

According to the above configuration (8), it is possible to supply the waste liquid cooler with cleaning water via the cleaning-water supply line, and thereby it is possible to clean the waste liquid cooler immediately after discharging the waste liquid from the container. Thus, it is possible to clean the waste liquid cooler efficiently, and thereby it is possible to prevent the waste liquid cooler from getting dirty effectively.

(9) In some embodiments, in the above configuration (8), the $CO_2$ recovery apparatus further includes a reflux water drum for separating $CO_2$ containing gas released from the regeneration tower into $CO_2$ gas and condensed water. The $CO_2$ recovery apparatus is configured such that at least a part of the condensed water stored in the reflux water drum is supplied to the waste liquid cooler as the cleaning water.

With the above configuration (9), the condensed water separated by the reflux water drum of the $CO_2$ recovery apparatus can be utilized in as cleaning water for cleaning the waste liquid cooler, and thus it is possible to clean the waste liquid cooler efficiently.

(10) According to at least one embodiment of the present invention, a reclaiming method includes: performing a reclaiming process on an absorption liquid in a container; discharging a waste liquid from the container via a waste liquid line, after the reclaiming process; cooling the waste liquid with a waste liquid cooler installed in the waste liquid line; and cleaning the waste liquid cooler by supplying the waste liquid cooler with cleaning water via a cleaning-water supply line, after cooling the waste liquid.

According to the above method (10), it is possible to supply the waste liquid cooler with cleaning water via the cleaning-water supply line, and thereby it is possible to clean the waste liquid cooler immediately after discharging the waste liquid from the container. Thus, it is possible to clean the waste liquid cooler efficiently, and thereby it is possible to prevent the waste liquid cooler from getting dirty effectively.

(11) In some embodiments, in the above method (10), the cleaning-water supply line is connected to the waste liquid line, and the step of cleaning includes supplying the cleaning water to the waste liquid cooler via the waste liquid line.

According to the above method (11), it is possible to supply the waste liquid cooler with the cleaning liquid via the cleaning liquid supply line connected to the waste liquid line, and thereby it is possible to simplify the structure of the supply system of the cleaning liquid. Further, with the above method (11), it is possible to clean a part of the waste liquid line.

(12) In some embodiment, the above method (10) or (11) further includes supplying the container with the cleaning water after cleaning the waste liquid cooler.

According to the above method (12), the cleaning water after cleaning the waste liquid cooler can be supplied to the container, and thereby it is possible to utilize cleaning water supplied to the container in the reclaiming process. As described above, by making effective use of cleaning water after cleaning the waste liquid cooler, it is possible to reduce the usage amount of water in the entire reclaiming apparatus, and perform the reclaiming process more efficiently.

(13) In some embodiments, in the above method (12), the step of cleaning includes supplying the waste liquid cooler with the cleaning water from the cleaning-water supply line connected to the waste liquid line at the upstream of the waste liquid cooler, and the step of supplying the container with the cleaning water includes supplying the container with the cleaning water in the waste liquid line at the downstream of the waste liquid cooler via a recycle line installed between the waste liquid line and the container.

According to the above method (13), it is possible to supply the container with cleaning water after cleaning the waste liquid cooler through a simple configuration in which a recycle line is installed between the container and the waste liquid line at the downstream of the waste liquid cooler.

(14) In some embodiments, in the above method (12), the step of cleaning includes supplying the waste liquid cooler with the cleaning water from the cleaning-water supply line connected to the waste liquid line at the downstream of the waste liquid cooler, and the step of supplying the container with the cleaning water includes supplying the container with the cleaning water from the waste liquid cooler via the waste liquid line at the upstream of the waste liquid cooler.

According to the above method (14), it is possible to supply the container with cleaning water after cleaning the waste liquid cooler through a simple configuration utilizing the waste liquid line at the upstream of the waste liquid cooler.

(15) According to at least one embodiment of the present invention, a $CO_2$ recovery method includes: a step of causing an absorption liquid containing an absorption agent to absorb $CO_2$ in exhaust gas, in an absorption tower; guiding the absorption liquid from the absorption tower to a regeneration tower, and regenerating the absorption liquid in the regeneration tower; performing the reclaiming method according to any one of the above (10) to (14); and supplying the container with at least a part of the absorption liquid stored in the regeneration tower.

According to the above method (15), it is possible to supply the waste liquid cooler with cleaning water via the cleaning-water supply line, and thereby it is possible to clean the waste liquid cooler immediately after discharging the waste liquid from the container. Thus, it is possible to clean the waste liquid cooler efficiently, and thereby it is possible to prevent the waste liquid cooler from getting dirty effectively.

According to at least one embodiment of the present invention, provided is a reclaiming apparatus and a reclaiming method, and a $CO_2$ recovery apparatus and a $CO_2$ recovery method capable of cleaning the waste liquid cooler efficiently.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

In the following description, a $CO_2$ absorption liquid containing a $CO_2$ absorption agent is reclaimed by a reclaiming apparatus. Nevertheless, the absorption agent and the absorption liquid according to the present invention is not limited to this. For instance, the absorption agent may be a $H_2S$ absorption agent that absorbs $H_2S$, and the absorption liquid may be a $H_2S$ absorption liquid that contains a $H_2S$ absorption agent. Further, in the following description, the $CO_2$ absorption agent and the $CO_2$ absorption liquid may be referred to as merely an absorption agent and an absorption liquid, respectively.

Figure 1:
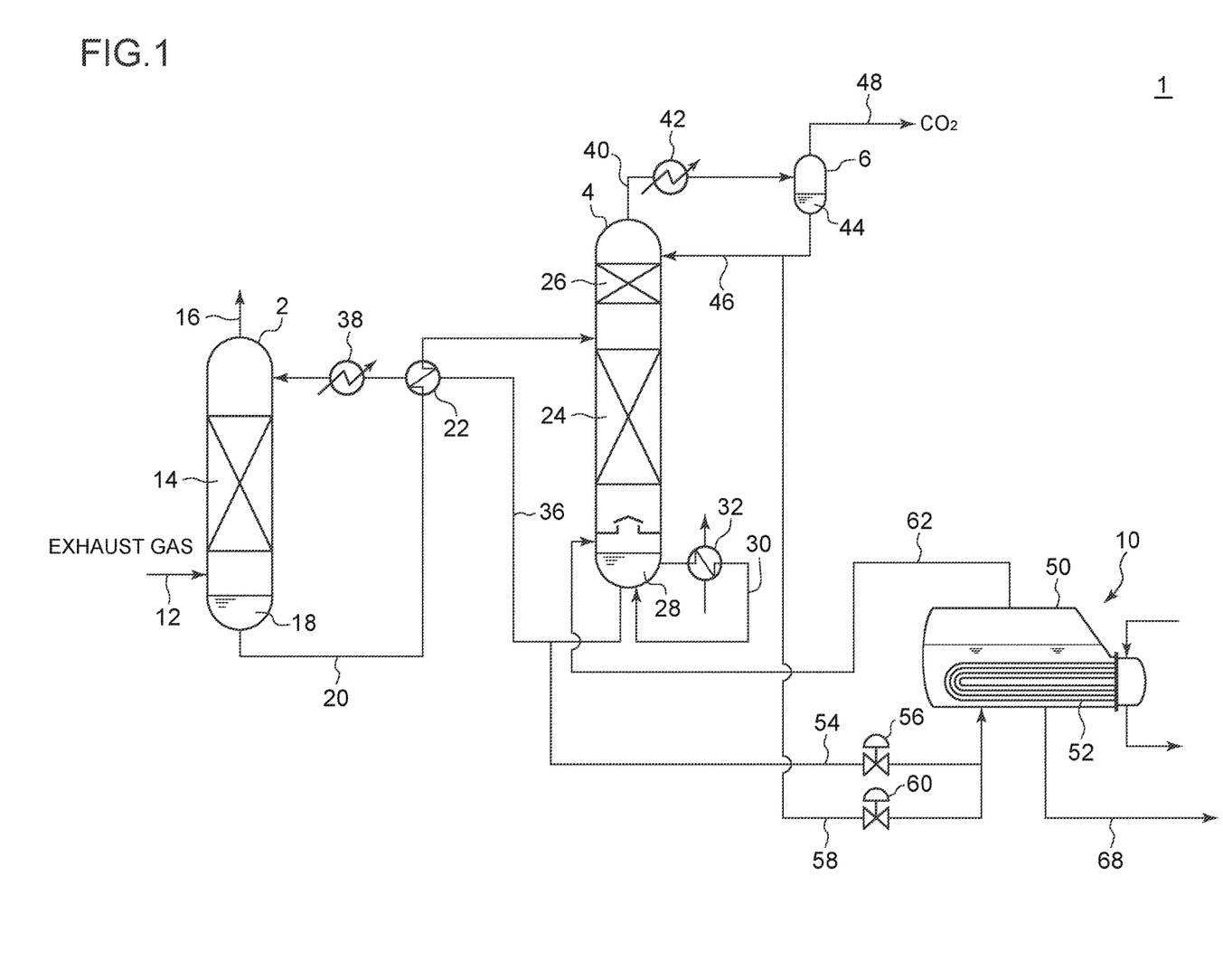
FIG. 1 is a schematic diagram of an example of a $CO_2$ recovery apparatus to which a reclaiming apparatus according to an embodiment is applied.

FIG. 1 is a schematic diagram of a $CO_2$ recovery apparatus to which a reclaiming apparatus according to an embodiment is applied. The $CO_2$ recovery apparatus shown in FIG. 1 is a device for recovering $CO_2$ from exhaust gas discharged from a power generation facility or a factory, for instance. As depicted in the drawings, the $CO_2$ recovery apparatus 1 includes an absorption tower 2 for causing an absorption liquid to absorb $CO_2$ in exhaust gas from a power generation facility or the like, a regeneration tower 4 for regenerating the absorption liquid having absorbed $CO_2$, a reflux water drum 6 configured to separate the release gas from the regeneration tower 4 into $CO_2$ gas and condensed water, and return the condensed water to the regeneration tower 4, and a reclaiming apparatus 10 for reclaiming the absorption liquid.

Exhaust gas containing $CO_2$ is supplied to the absorption tower 2 via an exhaust gas introduction line 12. Further, a pretreatment device for pre-processing exhaust gas (desulfurization, cooling, etc.) may be installed at the upstream of the absorption tower 2, and the absorption tower 2 may be supplied with exhaust gas after being treated with such pretreatment.

The absorption tower 2 includes an absorption part 14 formed by a packed layer, for instance, and the absorption part 14 is supplied with a CO2 absorption liquid containing a CO2 absorption agent from above.

The exhaust gas having flowed into the absorption tower 2 via the exhaust gas introduction line 12 flows upward through the absorption tower 2 from the side of the tower bottom part of the absorption tower 2, and flows into the absorption part 14. Further, in the absorption part 14, exhaust gas makes counter-current contact with the CO2 absorption liquid supplied from the upper part of the absorption part 14, and thereby CO2 in exhaust gas is absorbed by the CO2 absorption liquid.

The $CO_2$ absorption liquid may be an aqueous solution of the $CO_2$ absorption agent.

The type of the $CO_2$ absorption agent is not particularly limited. For instance, alkanolamines such as monoethanolamine and diethanolamine, or a basic material other than amines such as sodium hydroxide, potassium hydroxide and calcium hydroxide can be used the $CO_2$ absorption agent.

Exhaust gas deprived of $CO_2$ gas through contact with the $CO_2$ absorption liquid in the absorption part 14 is discharged outside from the tower top part 16 of the absorption tower 2.

On the other hand, the $CO_2$ absorption liquid having absorbed the $CO_2$ gas in the exhaust gas in the absorption part 14 falls onto the tower bottom part of the absorption tower, and is stored in the tower bottom part. The $CO_2$ absorption liquid stored in the tower bottom part of the absorption tower 2 is a rich absorption liquid 18 having a higher $CO_2$ concentration than the $CO_2$ absorption liquid described below stored in the tower bottom part of the regeneration tower 4. The rich absorption liquid 18 is supplied to the regeneration tower 4 from the absorption tower 2 via a rich liquid line 20 by a pump (not depicted) installed in the rich liquid line 20.

Further, as depicted in FIG. 1, a heat exchanger 22 for exchanging heat between the rich absorption liquid flowing through the rich liquid line 20 and the lean absorption liquid flowing through the lean liquid line 36 may be installed in the rich liquid line 20. By heating the rich absorption liquid through heat exchange with the lean absorption liquid having a relatively high temperature, it is possible to promote regeneration of the absorption liquid in the regeneration tower 4 described below.

The regeneration tower 4 includes a release part 24 that releases $CO_2$ gas from the rich absorption liquid and a cleaning device 26 which cleans the $CO_2$ gas released at the release part 24 with reflux water.

The release part 24 includes a packing material, and is supplied from the rich absorption liquid from above through the rich liquid line 20. The rich absorption liquid is heated by the steam described below, in the release part 24, releases $CO_2$ gas, and becomes a lean absorption liquid which contains a relatively low rate of $CO_2$.

The lean absorption liquid having released $CO_2$ gas at the release part 24 descends from the regeneration tower 4, and is stored in the tower bottom part of the regeneration tower 4. The lean absorption liquid 28 is guided, via a re-boiler line 30, to a regeneration heater (re-boiler) 32 installed in the re-boiler line 30. In the regeneration heater 32, the lean absorption liquid 28 exchanges heat with a heating medium (e.g. Water steam), whereby at least a part of the lean absorption liquid 28 changes in phase to saturated steam, and is guided to the tower bottom part of the regeneration tower 4. The saturated steam produced by the regeneration heater 32 as described above flows upward through the regeneration tower 4 toward the release part 24, and is used as a heating source for heating the rich absorption liquid at the release part 24.

The lean absorption liquid (containing a lean absorption liquid that has not changed its phase in the regeneration heater 32) stored in the tower bottom part of the regeneration tower 4 is taken out from the tower bottom part of the regeneration tower 4, and is supplied to the absorption part 14 of the absorption tower 2 via the lean liquid line 36 by a feeding pump (not depicted) installed in the lean liquid line 36, thereby being re-utilized as the above described $CO_2$ absorption liquid. Further, a cooler 38 for cooling the lean absorption liquid may be installed in the lean liquid line 36.

The $CO_2$ gas released from the rich absorption liquid at the release part 24 flows upward toward the cleaning device 26 installed above the release part 24 in the regeneration tower 4. The cleaning device 26 removes the absorption agent remaining in the $CO_2$ gas as the $CO_2$ gas from the release part 24 makes gas-liquid contact with the cleaning liquid supplied from above the cleaning device 26.

The cleaning device 26 is not particularly limited as long as it is capable of promoting gas-liquid contact between $CO_2$ gas and the first cleaning liquid. For instance, the cleaning device 26 may include one or more stages of trays or a packed layer.

The $CO_2$ gas after passing through the cleaning device 26 is released from the tower top part of the regeneration tower 4, and is guided to the $CO_2$ gas line 40. A condenser 42 is installed in the $CO_2$ gas line 40, and in the condenser 42, $CO_2$ gas is cooled and steam in the $CO_2$ gas is condensed. The $CO_2$ gas after passing through the condenser 42 is guided to the reflux water drum 6 installed on the outlet side of the $CO_2$ gas line 40.

The reflux water drum 6 is configured to separate release gas from the regeneration tower 4 ($CO_2$-containing gas) into $CO_2$ gas and condensed water.

The condensed water 44 separated by the reflux water drum 6 is stored in the tower bottom part of the reflux water drum 6. The condensed water 44 is supplied to the cleaning device 26 of the regeneration tower 4 as a cleaning liquid, via the reflux water line 46. Further, the condensed water 44 is supplied to the reclaiming apparatus 10, via the water supply line 58.

On the other hand, $CO_2$ gas separated by the reflux water drum 6 is released from the reflux water drum 6 via a recovery line 48 connected to the tower top part of the reflux water drum 6, compressed by a compressor (not depicted) installed in the recovery line 48, and is taken out of the system as product $CO_2$, for instance.

The reclaiming apparatus 10 is configured to remove non-volatile components such as impure substances from exhaust gas and depleted substances of the absorption liquid accumulating due to repetitive re-utilization of the absorption liquid in the $CO_2$ recovery apparatus 1, from a $CO_2$ absorption liquid including such non-volatile components, and recover the $CO_2$ absorption agent and return the $CO_2$ absorption agent to the $CO_2$ recovery apparatus 1.

Herein, FIGS. 2 to 5 are each a schematic diagram of a reclaiming apparatus 10 according to an embodiment.

As depicted in FIGS. 1 to 5, the reclaiming apparatus 10 includes a container 50 for storing an absorption liquid and water (container for reclaiming), an absorption-liquid supply line 54 for supplying the container 50 with an absorption liquid, a water supply line 58 for supplying water to the container 50, a steam discharge line 62 for discharging steam from the container 50, and a heating device 52 for heating a liquid containing water and an absorption liquid.

Further, an absorption liquid valve 56 for adjusting the supply amount of the absorption liquid to the container 50 is installed in the absorption-liquid supply line 54, and a water valve 60 for adjusting the supply amount of water to the container 50 is installed in the water supply line 58.

In some embodiments, the heating device 52 may be configured to heat a liquid inside the container through heat exchange between the liquid inside the container and a heating medium.

For instance, as depicted in FIG. 1, the heating device 52 includes a U-shaped steam pipe installed inside the container 50. The heating device 52 may be configured to heat the liquid inside the container through heat exchange with a heating medium. The heating medium supplied to the heating device 52 may be water vapor or oil, for instance.

Alternatively, the heating device 52 may be configured to heat a liquid inside the container 50 by electricity.

Further, in some embodiments, the heating device 52 may be installed outside the container 50. For instance, although not depicted, the heating device 52 may be configured to heat mixture of water and an absorption liquid before being supplied to the container 50, at downstream of a merge point of the absorption-liquid supply line 54 and the water supply line 58.

In some embodiments, as depicted in FIG. 1, a lean absorption liquid from the lean liquid line 36 may be supplied to the absorption-liquid supply line 54. In the embodiment depicted in FIG. 1, the lean absorption liquid is guided to the absorption-liquid supply line 54 from the lean liquid line 36 upstream of the heat exchanger 22. Nevertheless, in another embodiment, the lean absorption liquid may be guided to the absorption-liquid supply line 54 from the lean liquid line 36 downstream of the heat exchanger 22.

Further, in some embodiments, as depicted in FIG. 1, a part of the condensed water 44 stored in the reflux water drum 6 may be guided to the water supply line 58. Further, water supplied to the container 50 is not limited to the condensed water from the reflux water drum 6. The container 50 may be supplied with water from another supply source, instead of, or in addition to, the condensed water from the reflux water drum 6.

Further, in some embodiments, as depicted in FIG. 1 for instance, the outlet of the steam discharge line 62 may be connected to the regeneration tower 4. That is, steam discharged from the container 50 may be guided to the regeneration tower 4.

As depicted in FIGS. 2 to 5, the reclaiming apparatus 10 according to some embodiments includes the above described container 50, a waste-liquid recovery tank 78 for storing a waste liquid from the container 50, a waste liquid line 68 installed between the container 50 and the waste-liquid recovery tank 78, and a waste liquid cooler 72 installed in the waste liquid line 68.

The waste liquid cooler 72 is configured to cool the waste liquid from the container 50. The waste liquid cooler 72 may be configured to be supplied with a cooling medium, for instance, and cool the waste liquid through heat exchange with the cooling medium.

A procedure of reclaiming the absorption liquid by using the above described reclaiming apparatus 10 is as follows.

First, by opening the absorption liquid valve 56 and the water valve 60 to supply the container 50 with the absorption liquid and water, and heating the liquid inside the container with the heating device 52, the volatile components (water and absorption agent) in the liquid are evaporated, and the non-volatile components (depleted materials of the absorption liquid) are condensed in the liquid inside the container 50, and thereby the absorption agent in the liquid is separated from the non-volatile components (absorption liquid regeneration step).

Steam containing the absorption agent produced from heating is discharged from the container 50 via the steam discharge line 62, and returned to the regeneration tower 4 of the $CO_2$ recovery apparatus 1. The absorption agent returned to the regeneration tower 4 is used again as an absorption liquid that absorbs $CO_2$ in the $CO_2$ recovery apparatus 1.

Once the non-volatile components are sufficiently concentrated in the container 50 (i.e., the concentration of the non-volatile components in the liquid inside the container 50 increases sufficiently), the absorption liquid valve 56 is closed, and supply of the absorption liquid to the container 50 is stopped.

Next, by supplying the container 50 with water (condensed water from the reflux water drum 6, or the like) via the water supply line 58 and heating the liquid with the heating device 52 in a state where supply of the absorption liquid to the container 50 is shut off, the absorption agent remaining in the liquid is evaporated together with water. The steam containing the absorption agent produced in the container 50 from heating is discharged from the container 50 via the steam discharge line 62 (absorption liquid recovery step).

Once the concentration of the absorption agent in the liquid inside the container 50 decreases sufficiently, the water valve 60 is closed and supply of water to the container 50 is stopped, and heating of the liquid by the heating device 52 is stopped.

Further, sludge inside the container 50 is discharged as a waste liquid, to the outside of the container 50, via the waste liquid line 68 (discharge step). More specifically, the waste liquid valve 70 installed in the waste liquid line 68 is opened. Furthermore, in the embodiment depicted in FIGS. 2 to 4, the valve 92 is opened, and the waste liquid pump 74 installed in the waste liquid line 68 is started. Accordingly, the waste liquid containing reclaiming sludge remaining in the container 50 after completion of the above described absorption liquid recovery step is discharged from the container 50, and is sent to the waste liquid recovery tank 78 via the waste liquid line 68.

Further, the waste liquid discharged from the container 50 may be cooled by the waste liquid cooler 72 installed in the waste liquid line 68, and then sent to the waste-liquid recovery tank 78.

Hereinafter, a reclaiming apparatus 10 according to some embodiments will be described in more detail.

As depicted in FIGS. 2 to 5, the reclaiming apparatus 10 further includes a cleaning-water supply line 82 for supplying cleaning water to the waste liquid cooler 72.

In an illustrative embodiment depicted in FIGS. 2 to 5, the cleaning-water supply line 82 is connected to the waste liquid line 68. Further, the cleaning water from the cleaning-water supply line 82 is supplied to the waste liquid cooler 72 via the waste liquid line 68.

A cleaning water valve 84 capable of switching the supply state of cleaning water to the waste liquid cooler 72 is installed in the cleaning-water supply line 82.

As cleaning water, for instance, desalinated makeup water may be guided to the cleaning-water supply line 82. Further, as cleaning water, condensed water 44 stored in the reflux water drum 6 of the $CO_2$ recovery apparatus 1 may be used. In an illustrative embodiment depicted in FIGS. 2 to 5, a part of the condensed water from the reflux water drum 6 is supplied to the cleaning-water supply line 82 via a branch line 81 that branches from the water supply line 58 for supplying water for reclaiming to the container 50.

Further, in an illustrative embodiment depicted in FIGS. 2 to 5, cleaning water after cleaning the waste liquid cooler 72 can be supplied to the container 50.

Figure 2:
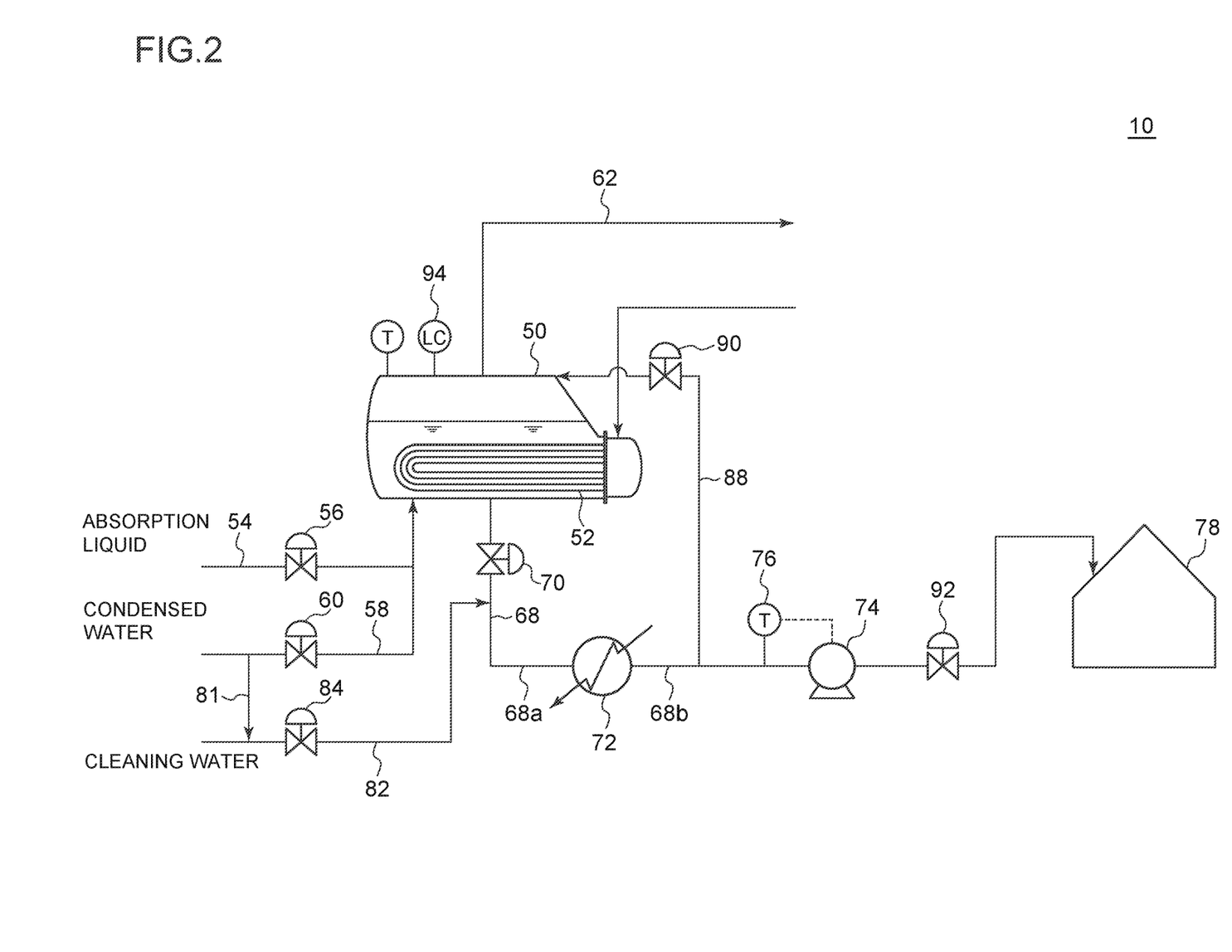
FIG. 2 is a schematic diagram of a reclaiming apparatus according to an embodiment.
Figure 3:
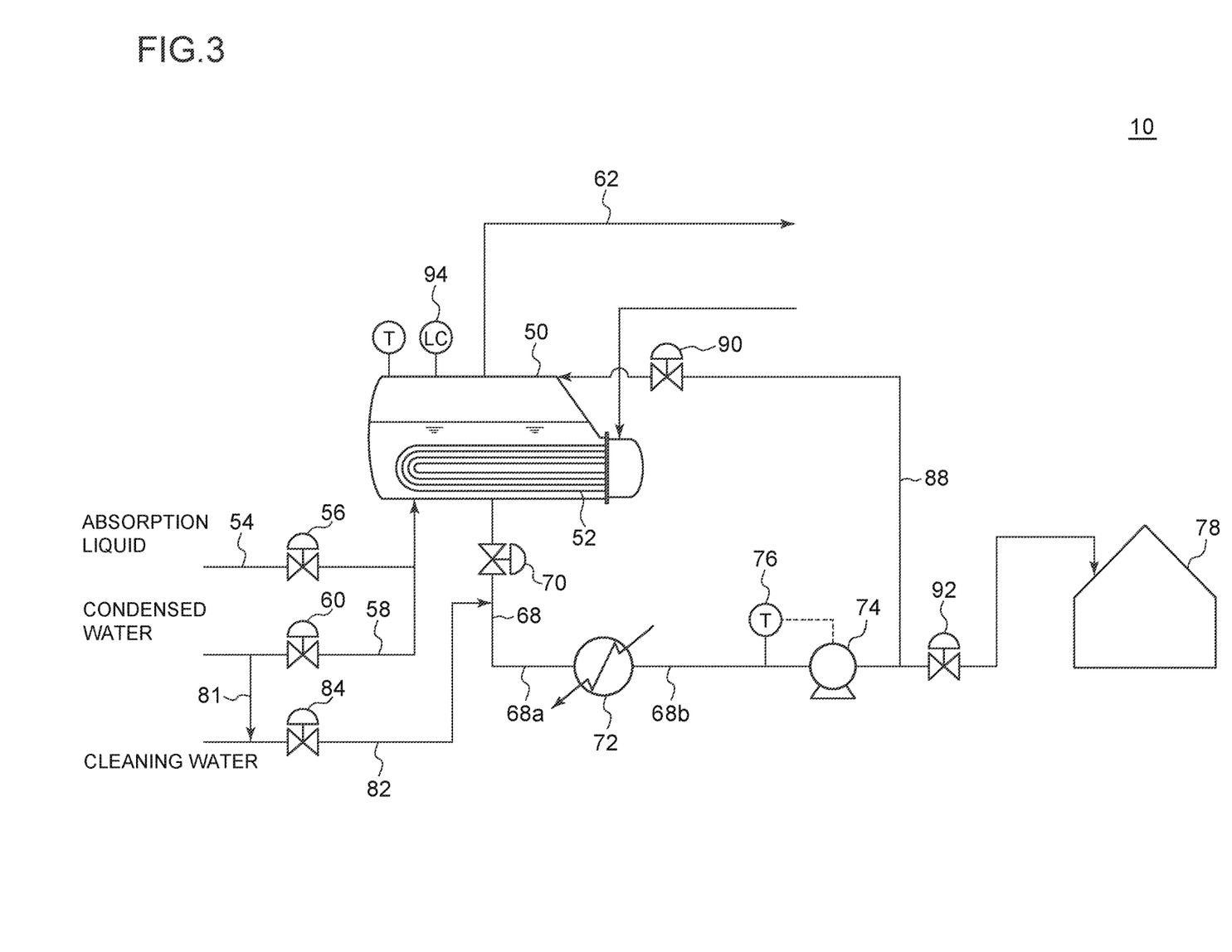
FIG. 3 is a schematic diagram of a reclaiming apparatus according to an embodiment.

More specifically, in the embodiment depicted in FIGS. 2 and 3, the cleaning-water supply line 82 is connected to the waste liquid line 68 at the upstream of the waste liquid cooler 72. Further, a recycle line 88 is provided, for supplying cleaning water in the waste liquid line 68 at the downstream of the waste liquid cooler 72 to a container.

Further, in the present specification, the upstream and the downstream of the waste liquid line 68 refer to the side of the container 50 and the side of the waste-liquid recovery tank 78, respectively, of the waste liquid line 68 connecting the container 50 and the waste liquid recovery tank 78.

In the embodiment depicted in FIG. 2, the recycle line 88 is installed so as to connect the container 50 to a portion of the waste liquid line 68 that is downstream of the waste liquid cooler 72 and upstream of the waste liquid pump 74.

In the embodiment depicted in FIG. 3, the recycle line 88 is installed so as to connect the container 50 to a portion of the waste liquid line 68 that is downstream of the waste liquid cooler 72 and the waste liquid pump 74.

Further, a valve 90 for switching the supply state of cleaning water to the container 50 from the recycle line 88 is installed in the recycle line 88.

In the embodiment depicted in FIGS. 2 and 3, the cleaning water is guided to the waste liquid cooler 72 via the waste liquid line 68a upstream of the waste liquid cooler 72. Further, cleaning water after cleaning the waste liquid cooler 72 is supplied to the container 50 via the waste liquid line 68b and the recycle line 88 downstream of the waste liquid cooler 72.

Figure 4:
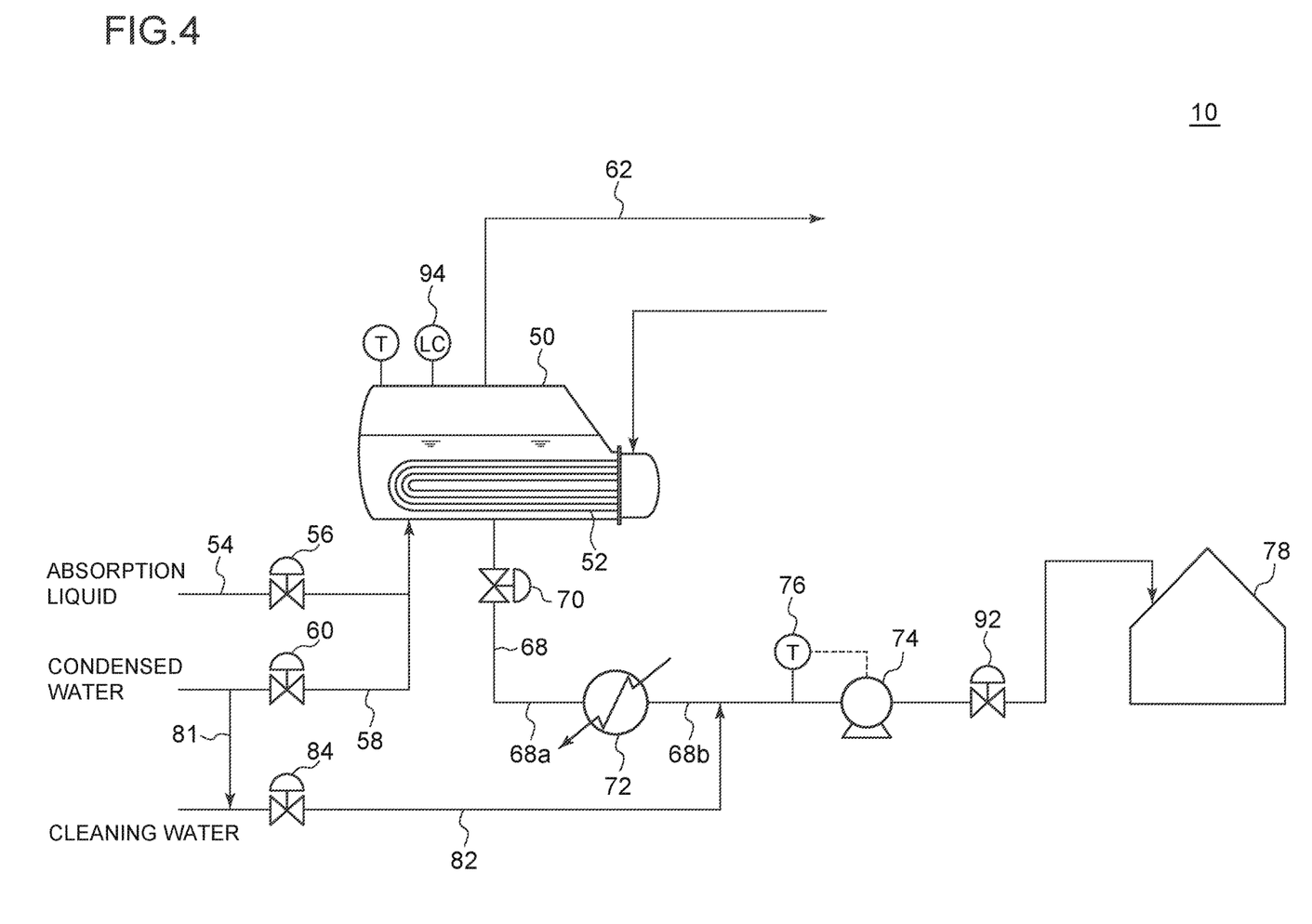
FIG. 4 is a schematic diagram of a reclaiming apparatus according to an embodiment.
Figure 5:
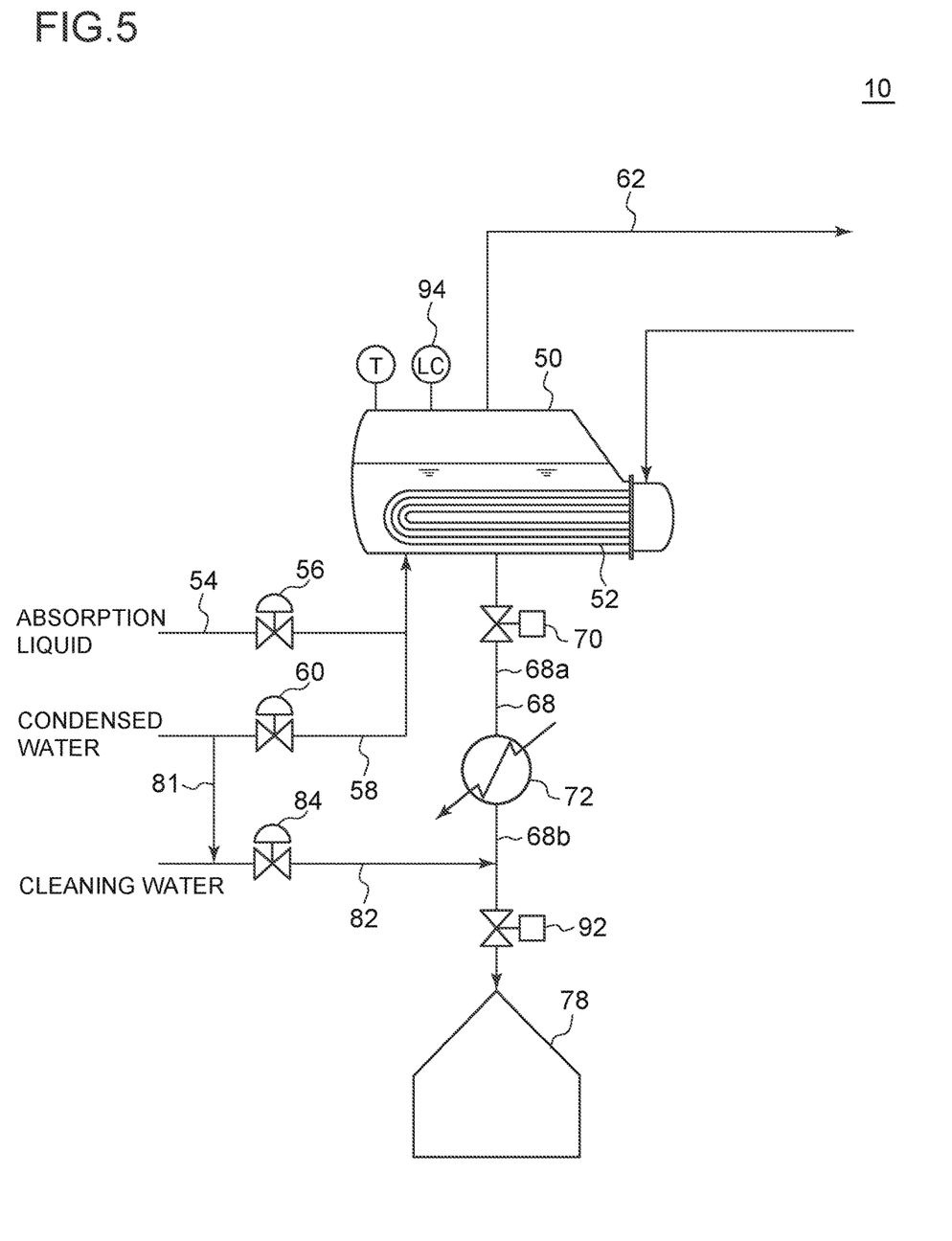
FIG. 5 is a schematic diagram of a reclaiming apparatus according to an embodiment.

Furthermore, in the embodiment depicted in FIGS. 4 and 5, the cleaning-water supply line 82 is connected to the waste liquid line 68 at the downstream of the waste liquid cooler 72. Further, cleaning water after cleaning the waste liquid cooler 72 is supplied to the container 50 from the waste liquid cooler 72 via the waste liquid line 68b upstream of the waste liquid cooler 72.

In the embodiment depicted in FIGS. 4 and 5, the cleaning water is guided to the waste liquid cooler 72 via the waste liquid line 68b downstream of the waste liquid cooler 72. Further, cleaning water after cleaning the waste liquid cooler 72 is supplied to the container 50 via the waste liquid line 68a upstream of the waste liquid cooler 72.

The cleaning water supplied to the container 50 after cleaning the waste liquid cooler 72 can be used as a part of water to be heated together with the absorption liquid in the container 50 in the next reclaiming.

In an illustrative embodiment depicted in FIGS. 2 to 4, a waste liquid pump 74 for pumping a waste liquid from the container 50 toward the waste-liquid recovery tank 78 is installed in the waste liquid line 68. By pumping the waste liquid to the waste-liquid recovery tank 78 with the waste liquid pump 74, it is possible to shorten the time required to discharge the waste liquid from the container 50.

For instance, as depicted in FIG. 5, the waste liquid from the container 50 may be recovered in the waste-liquid recovery tank 78 after passing through the waste liquid cooler 72 while descending through the waste liquid line 68 due to its own weight.

Further, as depicted in FIGS. 2 to 4, the reclaiming apparatus 10 may include a control device (not depicted) configured to adjust a discharge amount of the waste liquid via the waste liquid line 68, on the basis of the temperature of the waste liquid line 68 at the downstream of the waste liquid cooler 72. The above described temperature may be obtained by using a temperature sensor 76 installed in the waste liquid line 68 at the downstream of the waste liquid cooler 72.

The discharge amount of the waste liquid via the waste liquid line 68 may be adjusted through adjustment of the output of the waste liquid pump 74, or the opening-degree adjustment of the valve 92.

With such a control device, it is possible to adjust the discharge amount of the waste liquid via the waste liquid line 68, and maintain the temperature of the waste liquid at the time of discharge of the waste liquid appropriately. Accordingly, for instance, it is possible to suppress adherence of dirty substances to the waste liquid cooler 72 due to excessive cooling of the waste liquid.

The procedure of cleaning the waste liquid cooler 72 in the reclaiming apparatus 10 depicted in FIGS. 2 to 5 will be described below.

In a case of the reclaiming apparatus 10 depicted in FIG. 2, the waste liquid is discharged from the container 50 in the above described discharge step, and when the container 50 becomes empty inside, the waste liquid pump 74 is stopped, and the cleaning water valve 84 is opened after closing the waste liquid valve 70 and the valve 92, and the cleaning water is supplied to the waste liquid cooler 72 via the waste liquid line 68*a* downstream of the waste liquid cooler 72. Further, the valve 90 installed in the recycle line 88 is opened, and cleaning water after cleaning the waste liquid cooler 72 is supplied to the container 50 via the recycle line 88. When the container 50 is filled with cleaning water, the cleaning water valve 84 and the valve 90 are closed, and cleaning of the waste liquid cooler 72 and supply of cleaning water to the container 50 are stopped.

Due to the above procedure, cleaning of the waste liquid cooler 72 is completed, and it is possible to prepare for the next reclaiming.

In a case of the reclaiming apparatus 10 depicted in FIG. 3, the waste liquid is discharged from the container 50 in the above described discharge step, and when the container 50 becomes empty inside, the waste liquid pump 74 is stopped, and the cleaning water valve 84 is opened after closing the valve 92, and the cleaning water is supplied to the waste liquid cooler 72 via the waste liquid line 68*b* at the downstream of the waste liquid cooler 72. Further, when the liquid-surface level inside the container 50 reaches a predetermined value, the waste liquid pump 74 is started, and cleaning water after cleaning the waste liquid cooler 72 is supplied to the container 50 via the recycle line 88. When the container 50 is filled with cleaning water, the waste liquid pump 74 is stopped, and the cleaning water valve 84, the waste liquid valve 70 and the valve 90 are closed, and cleaning of the waste liquid cooler 72 and supply of cleaning water to the container 50 are stopped.

According to the above procedure, cleaning of the waste liquid cooler 72 is completed, and it is possible to prepare for the next reclaiming.

The liquid surface level inside the container 50 may be obtained by a liquid surface level meter 94 installed in the container.

In a case of the reclaiming apparatus 10 depicted in FIG. 4, the waste liquid is discharged from the container 50 in the above described discharge step, and when the container 50 becomes empty inside, the waste liquid pump 74 is stopped, and the cleaning water valve 84 is opened after closing the valve 92 to supply the waste liquid cooler 72 with cleaning water via the waste liquid line 68*b* at the downstream of the waste liquid cooler 72, and the cleaning water after cleaning the waste liquid cooler 72 is supplied to the container 50 via the waste liquid line 68*a* on the upstream of the waste liquid cooler 72. When the container 50 is filled with cleaning water, the cleaning water valve 84 and the waste liquid valve 70 are closed, and cleaning of the waste liquid cooler 72 and supply of cleaning water to the container 50 are stopped.

According to the above procedure, cleaning of the waste liquid cooler 72 is completed, and it is possible to prepare for the next reclaiming.

In a case of the reclaiming apparatus 10 depicted in FIG. 5, the waste liquid is discharged from the container 50 in the above described discharge step, and when the container 50 becomes empty inside, the waste liquid valve 70 is closed. Further, the cleaning water valve 84 is opened to supply the waste liquid cooler 72 with cleaning water via the waste liquid line 68*b* at the downstream of the waste liquid cooler 72, and the cleaning water after cleaning the waste liquid cooler 72 is supplied to the container 50 via the waste liquid line 68*a* on the upstream of the waste liquid cooler 72. When the container 50 is filled with cleaning water, the cleaning water valve 84 and the waste liquid valve 70 are closed, and cleaning of the waste liquid cooler 72 and supply of cleaning water to the container 50 are stopped.

According to the above procedure, cleaning of the waste liquid cooler 72 is completed, and it is possible to prepare for the next reclaiming.

Further, in the above described procedure of cleaning of the waste liquid cooler 72, the opening-closing operation of various valves including the cleaning water valve 84, the waste liquid valve 70, the valve 90, or the valve 92 may be controlled by a control device (not depicted). In this case, the control device may control opening and control of each valve on the basis of the liquid-surface level inside the container 50.

According to the reclaiming apparatus 10 according to some embodiments described above, it is possible to supply the waste liquid cooler 72 with cleaning water via the cleaning-water supply line 82, and thereby it is possible to clean the waste liquid cooler 72 immediately after discharging the waste liquid from the container 50. Thus, it is possible to clean the waste liquid cooler 72 efficiently, and thereby it is possible to prevent the waste liquid cooler 72 from getting dirty effectively.

Further, like the above described reclaiming apparatus 10, as the cleaning water after cleaning the waste liquid cooler 72 can be supplied to the container 50, it is possible to utilize cleaning water supplied to the container 50 in the reclaiming process. As described above, by making effective use of cleaning water after cleaning the waste liquid cooler 72, it is possible to reduce the usage amount of water in the entire reclaiming apparatus 10, and perform the reclaiming process more efficiently.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

2 Absorption tower
4 Regeneration tower
6 Reflux water drum
10 Reclaiming apparatus
12 Exhaust gas introduction line
14 Absorption part
16 Tower top part
18 Rich absorption liquid
20 Rich liquid line
22 Heat exchanger
24 Release part
26 Cleaning device
28 Lean absorption liquid
30 Re-boiler line
32 Regeneration heater
38 Lean liquid line
40 Cooler
42 $CO_2$ gas line
44 Condenser
44 Condensed water
46 Reflux water line
48 Recovery line
50 Container
52 Heating device
54 Absorption-liquid supply line
56 Absorption liquid valve
58 Water supply line
60 Water valve
62 Steam discharge line
68 Waste liquid line
70 Waste liquid valve
72 Waste liquid cooler
74 Waste liquid pump
76 Temperature sensor
78 Waste-liquid recovery tank
81 Branch line
82 Cleaning-water supply line
84 Cleaning water valve
88 Recycle line
90 Valve
92 Valve
94 Liquid surface level meter

The invention claimed is:

1. A reclaiming apparatus, comprising:
a container in which a reclaiming process of an absorption liquid is performed;
a waste liquid line configured to carry a flow of a waste liquid from the container;
a waste liquid cooler, installed in the waste liquid line, for cooling the waste liquid from the container;
a cleaning-water supply line for supplying the waste liquid cooler with cleaning water for cleaning the waste liquid cooler; and
a line configured to supply the container with the cleaning water after the cleaning water has been used to clean the waste liquid cooler.

2. The reclaiming apparatus according to claim 1, wherein the cleaning-water supply line is connected to the waste liquid line, and
wherein the reclaiming apparatus is configured such that the cleaning water is supplied to the waste liquid cooler via the waste liquid line.

3. The reclaiming apparatus according to claim 1, wherein the cleaning-water supply line is connected to the waste liquid line at an upstream of the waste liquid cooler, and
wherein the reclaiming apparatus further includes a recycle line for supplying the container with the cleaning water in the waste liquid line at a downstream of the waste liquid cooler.

4. The reclaiming apparatus according to claim 1, wherein the cleaning-water supply line is connected to the waste liquid line at the downstream of the waste liquid cooler, and
wherein the reclaiming apparatus is configured such that the container is supplied with the cleaning water from the waste liquid cooler via the waste liquid line at the upstream of the waste liquid cooler after the cleaning water has been used for cleaning the waste liquid cooler.

5. The reclaiming apparatus according to claim 1, further comprising a waste liquid pump, installed in the waste liquid line, for pumping the waste liquid from the container.

6. The reclaiming apparatus according to claim 1, further comprising:
a temperature sensor configured to measure a temperature of the waste liquid line at the downstream of the waste liquid cooler; and
a control device configured to adjust a discharge amount of the waste liquid via the waste liquid line based on a measurement result of the temperature sensor.

7. A CO2 recovery apparatus, further comprising:
an absorption tower configured to remove CO2 in exhaust gas by contacting the exhaust gas with an absorption liquid containing an absorption agent;
a regeneration tower for regenerating the absorption liquid from the absorption tower; and
the reclaiming apparatus according to claim 1,
wherein the CO2 recovery apparatus is configured such that at least a part of the absorption liquid stored in the regeneration tower is supplied to the container.

8. The CO2 recovery apparatus according to claim 7, further comprising a reflux water drum for separating a CO2 containing gas released from the regeneration tower into a CO2 gas and a condensed water, wherein the CO2 recovery apparatus is configured such that at least a part of the condensed water stored in the reflux water drum is supplied to the waste liquid cooler as the cleaning water.

9. A reclaiming method, comprising:
a step of performing a reclaiming process on an absorption liquid in a container;
a step of discharging a waste liquid from the container via a waste liquid line, after the reclaiming process;
a step of cooling the waste liquid with a waste liquid cooler installed in the waste liquid line;
a step of cleaning the waste liquid cooler by supplying the waste liquid cooler with a cleaning water via a cleaning-water supply line, after cooling the waste liquid; and
a step of supplying the container with the cleaning water after cleaning the waste liquid cooler.

10. The reclaiming method according to claim 9,
wherein the cleaning-water supply line is connected to the waste liquid line, and
wherein the step of cleaning includes supplying the cleaning water to the waste liquid cooler via the waste liquid line.

11. The reclaiming method according to claim 9,
wherein the step of cleaning includes supplying the waste liquid cooler with the cleaning water from the cleaning-water supply line connected to the waste liquid line at the upstream of the waste liquid cooler, and
wherein the step of supplying the container with the cleaning water includes supplying the container with the cleaning water in the waste liquid line at the downstream of the waste liquid cooler via a recycle line installed between the waste liquid line and the container.

12. The reclaiming method according to claim 9,
wherein the step of cleaning includes supplying the waste liquid cooler with the cleaning water from the cleaning-water supply line connected to the waste liquid line at the downstream of the waste liquid cooler, and
wherein the step of supplying the container with the cleaning water includes supplying the container with the cleaning water from the waste liquid cooler via the waste liquid line at the upstream of the waste liquid cooler.

13. A CO2 recovery method, comprising:
a step of causing an absorption liquid containing an absorption agent to absorb CO2 in an exhaust gas, in an absorption tower;
a step of guiding the absorption liquid from the absorption tower to a regeneration tower, and regenerating the absorption liquid in the regeneration tower;
a step of performing the reclaiming method according to claim 9; and
a step of supplying the container with at least a part of the absorption liquid stored in the regeneration tower.

* * * * *

UNITED STATES PATENT AND TRADEMARK OFFICE
CERTIFICATE OF CORRECTION

PATENT NO. : 10,967,324 B2  
APPLICATION NO. : 16/156129  
DATED : April 6, 2021  
INVENTOR(S) : Osamu Miyamoto et al.

Page 1 of 1

It is certified that error appears in the above-identified patent and that said Letters Patent is hereby corrected as shown below:

On the Title Page

In Item (54), Title of Invention, "RECLAIMING APPARATUS AND METHOD, AND $CO_2$ RECOVERY DEVICE AND METHOD" should read -- RECLAIMING APPARATUS AND METHOD, AND $CO_2$ RECOVERY APPARATUS AND METHOD --.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*